(12) United States Patent
Wong et al.

(10) Patent No.: US 8,100,588 B2
(45) Date of Patent: Jan. 24, 2012

(54) SMALL FORM FACTOR PLUGGABLE (SFP) OPTICAL TRANSCEIVER MODULE AND METHOD

(75) Inventors: Tom Sheau Tung Wong, Singapore (SG); Adrianus Van Haasteren, Singapore (SG); Tze Wei Lim, Singapore (SG)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/900,921

(22) Filed: Oct. 8, 2010

(65) Prior Publication Data
US 2011/0019998 A1    Jan. 27, 2011

Related U.S. Application Data

(62) Division of application No. 12/367,677, filed on Feb. 9, 2009, now Pat. No. 7,824,113.

(51) Int. Cl.
*G02B 6/36* (2006.01)
*H04B 10/00* (2006.01)

(52) U.S. Cl. ............ 385/53; 385/54; 385/55; 385/56; 385/57; 385/58; 385/59; 385/60; 385/69; 385/70; 385/71; 385/72; 385/73; 385/74; 385/75; 385/76; 385/77; 385/78; 385/79; 385/86; 385/87; 385/88; 398/135; 398/138; 398/139

(58) Field of Classification Search .............. 385/53–94; 398/135, 138–139
See application file for complete search history.

(56) References Cited

U.S. PATENT DOCUMENTS

| | | | | |
|---|---|---|---|---|
| 4,645,295 A * | 2/1987 | Pronovost | | 385/55 |
| 4,784,456 A * | 11/1988 | Smith | | 385/55 |
| 4,787,706 A * | 11/1988 | Cannon et al. | | 385/59 |
| 4,871,227 A * | 10/1989 | Tilse | | 385/55 |
| 5,579,425 A | 11/1996 | Lampert et al. | | |
| 5,731,546 A * | 3/1998 | Miles et al. | | 174/135 |
| 6,048,106 A * | 4/2000 | Iwase | | 385/88 |
| 6,250,817 B1 | 6/2001 | Lampert et al. | | |
| 6,325,549 B1 * | 12/2001 | Shevchuk | | 385/86 |
| 6,485,192 B1 | 11/2002 | Plotts et al. | | |
| 6,551,117 B2 * | 4/2003 | Poplawski et al. | | 439/92 |
| 6,607,307 B2 | 8/2003 | Gilliland et al. | | |
| 6,632,030 B2 | 10/2003 | Jiang et al. | | |
| 6,762,940 B2 | 7/2004 | Zaremba | | |
| 6,824,416 B2 | 11/2004 | Di Mascio | | |
| 7,013,088 B1 * | 3/2006 | Jiang et al. | | 398/139 |
| 7,031,574 B2 | 4/2006 | Huang et al. | | |
| 7,077,686 B2 | 7/2006 | Seo et al. | | |
| 7,090,509 B1 * | 8/2006 | Gilliland et al. | | 439/76.1 |

(Continued)

OTHER PUBLICATIONS

Evolution of Pluggable Transceivers; Aug. 2, 2002; 7 Pages; Tyco Electronics; Harrisburg, PA; US.
Tyco Electronics, "Evolution of Pluggable Transceivers", Harrisburg, PA; US. Aug. 2, 2002 , 7 pages.

*Primary Examiner* — Brian M. Healy
*Assistant Examiner* — Guy Anderson (57) ABSTRACT

A small form factor pluggable (SFP) optical transceiver module and method for performing optical communications are provided. The SFP optical transceiver module has a housing to which a duplex receptacle is secured. The duplex receptacle has a C-shaped opening, the upper and lower portions of which are defined by upper and lower flexible retaining elements for receiving and retaining a duplex optical connector therein. An electrical assembly of the module is secured within the transceiver module housing. The electrical assembly comprises a PCB, the back end of which is configured as a plug end for removably plugging the PCB into a receptacle of an external communications management system.

16 Claims, 10 Drawing Sheets

U.S. PATENT DOCUMENTS

| | | | |
|---|---|---|---|
| 7,178,996 B2 * | 2/2007 | Malagrino et al. | 385/92 |
| 7,226,220 B2 * | 6/2007 | Choy et al. | 385/92 |
| 7,350,984 B1 | 4/2008 | Togami et al. | |
| 7,373,031 B2 * | 5/2008 | Wang et al. | 385/14 |
| 7,421,181 B2 | 9/2008 | Kanou et al. | |
| 7,488,123 B2 * | 2/2009 | Chan | 385/92 |
| 2008/0037938 A1 | 2/2008 | Kiani et al. | |

* cited by examiner

SMALL FORM FACTOR PLUGGABLE (SFP) OPTICAL TRANSCEIVER MODULE AND METHOD

CROSS-REFERENCE TO RELATED APPLICATIONS

This application is a divisional application of U.S. application Ser. No. 12/367,677, filed on Feb. 9, 2009, and entitled "A SMALL FORM FACTOR PLUGGABLE (SFP) OPTICAL TRANSCEIVER MODULE AND METHOD", which is a continuation-in-part (CIP) application of a U.S. application Ser. No. 12/040,986, filed on Mar. 3, 2008, and entitled "OPTICAL TRANSCEIVER MODULE AND DUPLEX FIBER OPTIC CONNECTOR", which are incorporated by reference herein in their entirety and to which priority is claimed.

TECHNICAL FIELD OF THE INVENTION

The invention relates to optical fiber communications systems, and more particularly, to a small form factor pluggable (SFP) optical transceiver module and method.

BACKGROUND OF THE INVENTION

In optical communications systems, an optical link generally comprises an optical transmitter and an optical receiver that are connected to each other by a fiber optic cable comprising one or more optical fibers. The optical transmitter generally includes one or more light sources, such as, for example, one or more light-emitting diodes (LEDs) or laser diodes, which convert an electrical data signal into a modulated light signal. This modulated light signal is then transmitted over an optical fiber cable and is received by the optical receiver. The optical receiver generally includes a light detector, such as, for example, a photosensor, a photodiode, etc., which receives the modulated light propagating in the optical fiber cable and converts the light signal back into an electrical data signal.

The housing of an optical transmitter or receiver includes appropriate electrical circuitry that interfaces with other optical communications equipment. The front face of the housing (which comprises a plastic or similar material) includes a receptacle for receiving a fiber optic connector to which an optical fiber cable is terminated. The optical transmitter and receiver are interconnected by the optical fiber cable.

To secure the fiber optic connector within the receptacle, the receptacle comprises an optical port having features for retaining the connector in the receptacle and for maintaining the end of the optical fiber of the cable in optical alignment with an optics system of the optical transmitter or receiver. The optics system directs light between the ends of the fiber and an active optical element of the optical transmitter or receiver. For example, in a typical optical transmitter, the optics system directs light produced by an active optical element such as an LED or laser diode into the end of the optical fiber retained in the optical port of the receptacle. In a typical optical receiver, the optics system directs light that propagates out of the end of the optical fiber retained within the optical port onto an active optical element such as a photodiode. A popular industrial receptacle known as the Versatile Link receptacle includes a horizontal C-shaped feature defined by opposing elements that protrude from the receptacle.

In Small form factor (SFP) optical communications systems, an optical fiber cable having a transmit optical fiber and an optical fiber cable having a receive optical fiber are terminated on their ends with a duplex connector that plugs into a duplex receptacle of the SFP housing. The duplex receptacle is secured to the housing of the duplex SFP system. The housing of the duplex SFP system is typically configured to be inserted into a cage. The housing includes an optics system, two active optical elements (i.e., a light source and a light detector), and electrical circuitry.

Currently, there are two types of SFP transceivers that are prevalent in the market, namely, systems that use LC connectors and systems that use MTRJ connectors. The most commonly used connector is the LC connector.

In SFP systems that use LC connectors, a duplex LC connector terminates the ends two optical fiber cables, one of which has a transmit fiber and the other of which has a receive fiber. The system housing has a duplex LC receptacle that is configured to receive the duplex LC connector and to lock the connector in the duplex receptacle in optical alignment with the optics system of the SFP system housing.

In some fiber optic applications, glass optical fibers are used whereas in other fiber optic applications polymer optical fibers (POFs) are used. Optical fiber cables that use POFs are more cost effective than optical fiber cables that use glass fibers. POF cables also provides easier field termination than fiber optic cables that use glass fibers, and POFs are less susceptible to dust contamination than glass fibers due to the larger fiber core diameters of POFs. The LC connector and the MTRJ connector are designed to terminate ends of glass fibers, which have small diameters. The LC connector and MTRJ connector are not suited for terminating the ends of POFs because of the large diameter of this type of fiber.

SUMMARY OF THE INVENTION

The invention is directed to methods for performing optical communications. The method, in accordance with an embodiment, comprises providing a duplex optical connector having a housing configured to be secured to a SFP optical transceiver module, securing a first end of a first optical fiber cable to the duplex optical connector, securing a first end of a second optical fiber cable to the duplex optical connector, providing a SFP optical transceiver module with a duplex receptacle having a C-shaped opening formed therein. The C-shaped opening is defined on upper and lower portions thereof by flexible upper and lower retaining elements, respectively, configured to receive and retain a duplex optical connector that has first and second optical fiber cables secured thereto. The method further comprises connecting the duplex optical connector to the SFP optical transceiver module.

The method, in accordance with another embodiment, comprises providing a SFP optical transceiver module, and connecting a duplex optical connector to the SFP optical transceiver module, wherein the SFP optical transceiver module comprises a transceiver module housing having a front end and a back end, a duplex receptacle secured to the front end of the transceiver module housing for receiving the duplex optical connector, and an electrical assembly secured within the transceiver module housing. The duplex receptacle has a C-shaped opening formed therein. The C-shaped opening is defined on upper and lower portions thereof by flexible upper and lower retaining elements, respectively, configured to receive and retain a duplex optical connector that has first and second optical fiber cables secured thereto. The electrical assembly comprises a PCB having at least a front end and a back end, the back end being configured as a plug end for removably plugging the PCB into a receptacle of an external communications management system. The plug end has electrical contacts thereon for electrically connecting electrical circuitry of the PCB to electrical interconnections in the receptacle of the external communications management system.

These and other features and advantages of the invention will become apparent from the following description, drawings and claims.

DETAILED DESCRIPTION OF ILLUSTRATIVE EMBODIMENTS

Various embodiments of a duplex fiber optic connector 100 (FIGS. 1-3) and of a SFP optical transceiver module 200 (FIGS. 4-10) are described herein. Prior to describing the duplex fiber optic connector module 100, a detailed description of the SFP optical transceiver module 200 will be provided.

Figure 7:
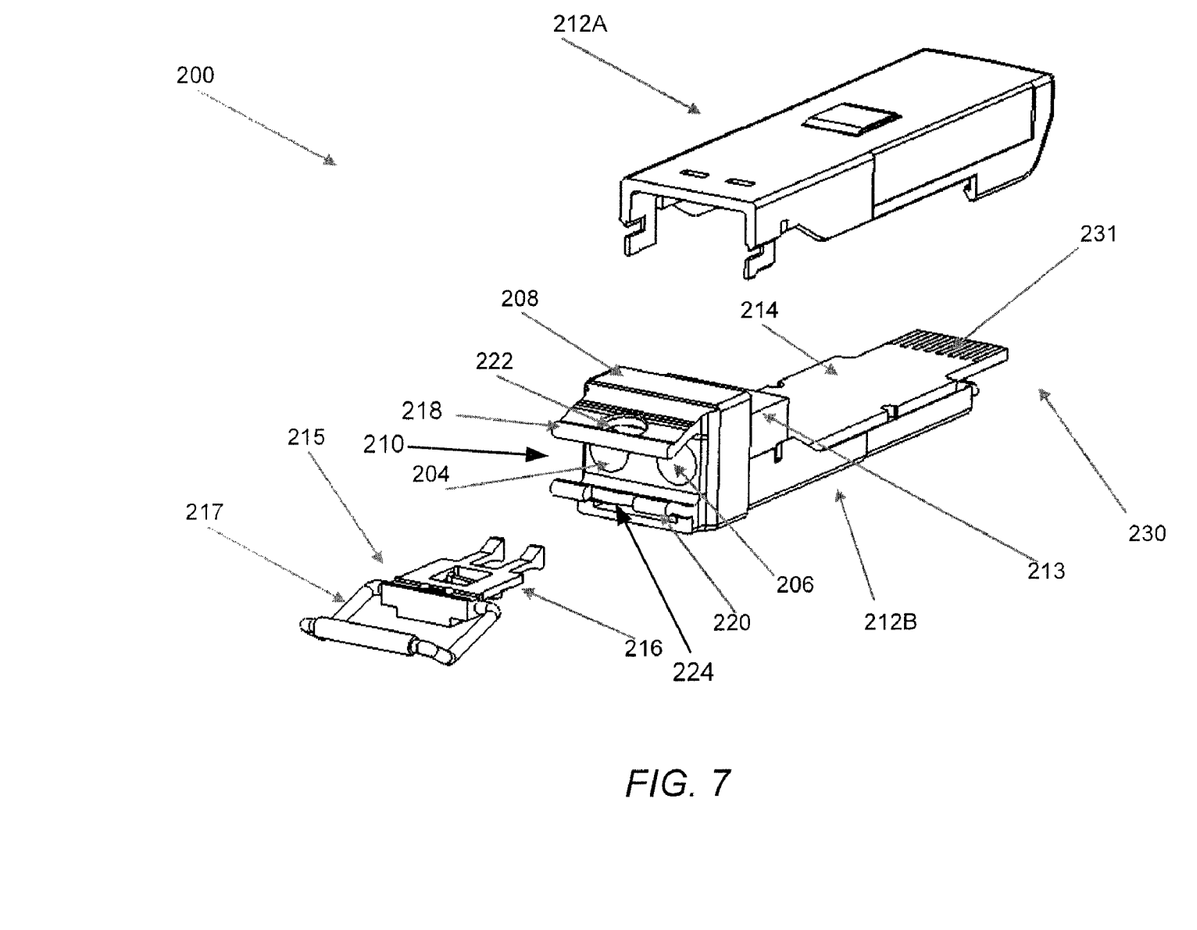
FIG. 7 illustrates a perspective view of the SFP optical transceiver module in accordance with an embodiment of the invention, wherein the module is shown partially disassembled.

FIG. 7 illustrates a perspective view of the SFP optical transceiver module 200 in its partially disassembled form. In accordance with this embodiment, the SFP optical transceiver module 200 includes a duplex receptacle 208, an upper housing portion 212A, a lower housing portion 212B, an optical assembly 213, an electrical assembly 214, and a latching mechanism 215. The upper and lower housing portions 212A and 212B are pressed together to cause locking features on the upper and lower housing portions 212A and 212B to interlock. In accordance with this embodiment, the electrical assembly 214 comprises a PCB having a plug end 230 with electrical contacts 231 located thereon. As will be described below with reference to FIG. 8, when the SFP optical transceiver module 200 is inserted into a cage receptacle, the electrical contacts 231 on the plug end 230 come into contact with electrical connections of a communications management system.

The SFP optical transceiver module 200 includes both transmitter and receiver components to form an optical transceiver module. In accordance with an embodiment, the duplex receptacle 208 of the SFP optical transceiver module 200 has a C-shaped opening 210 formed therein that is defined by upper and lower flexible retaining elements 218 and 220, respectively, for receiving and retaining the duplex fiber optic connector 100 (FIGS. 1-3) within the SFP optical transceiver module 200. This configuration of the duplex receptacle 208 enables the module 200 to have backwards compatibility with existing Versatile Link (VL) connectors that are commonly used in, for example, industrial fiber optic links. Furthermore, the connector 100 and the transceiver module 200 support an improved connector latching feature that improves the retention force robustness, is less prone to breakage as compared to existing connectors such as the VL connector, for example, and also offers a connector orientation feature for ease of insertion. These latching and orientation features are described below in detail with reference to FIGS. 2, 3 and 10.

Figure 1:
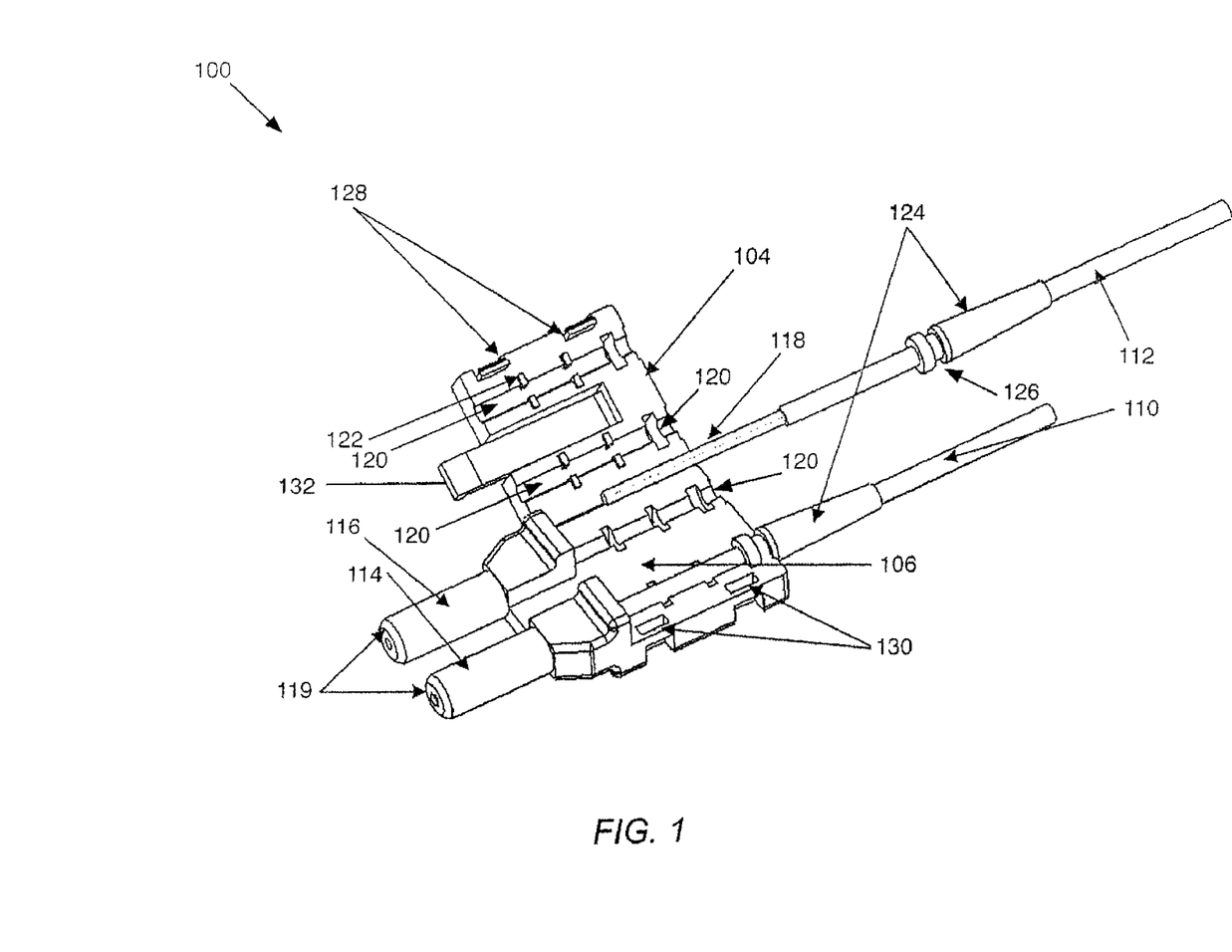
FIG. 1 is perspective diagram of one embodiment of a duplex fiber optic connector adapted to be received by the SFP optical transceiver module of the invention with the housing of the connector opened to illustrate its configuration on its inside.
Figure 2:
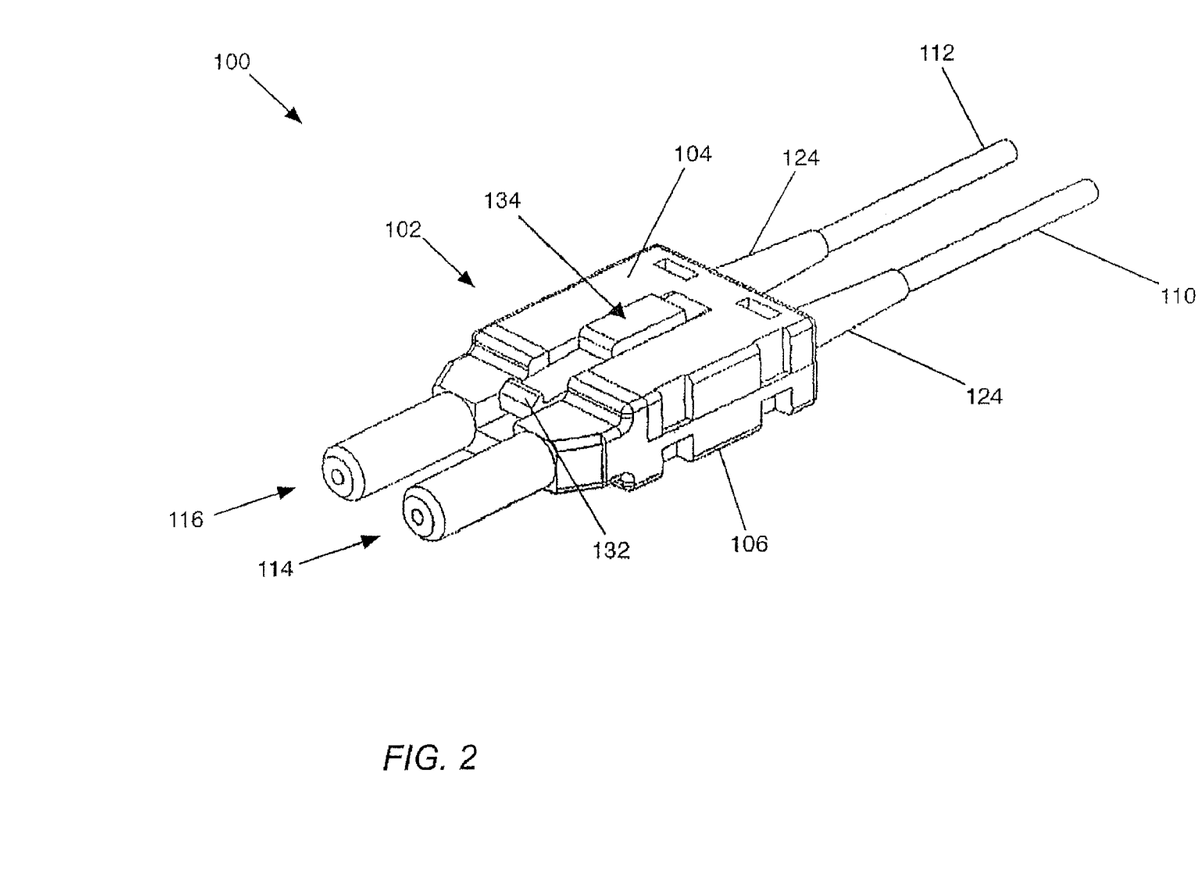
FIG. 2 illustrates the duplex fiber optic connector of FIG. 1 with the housing closed.
Figure 3:
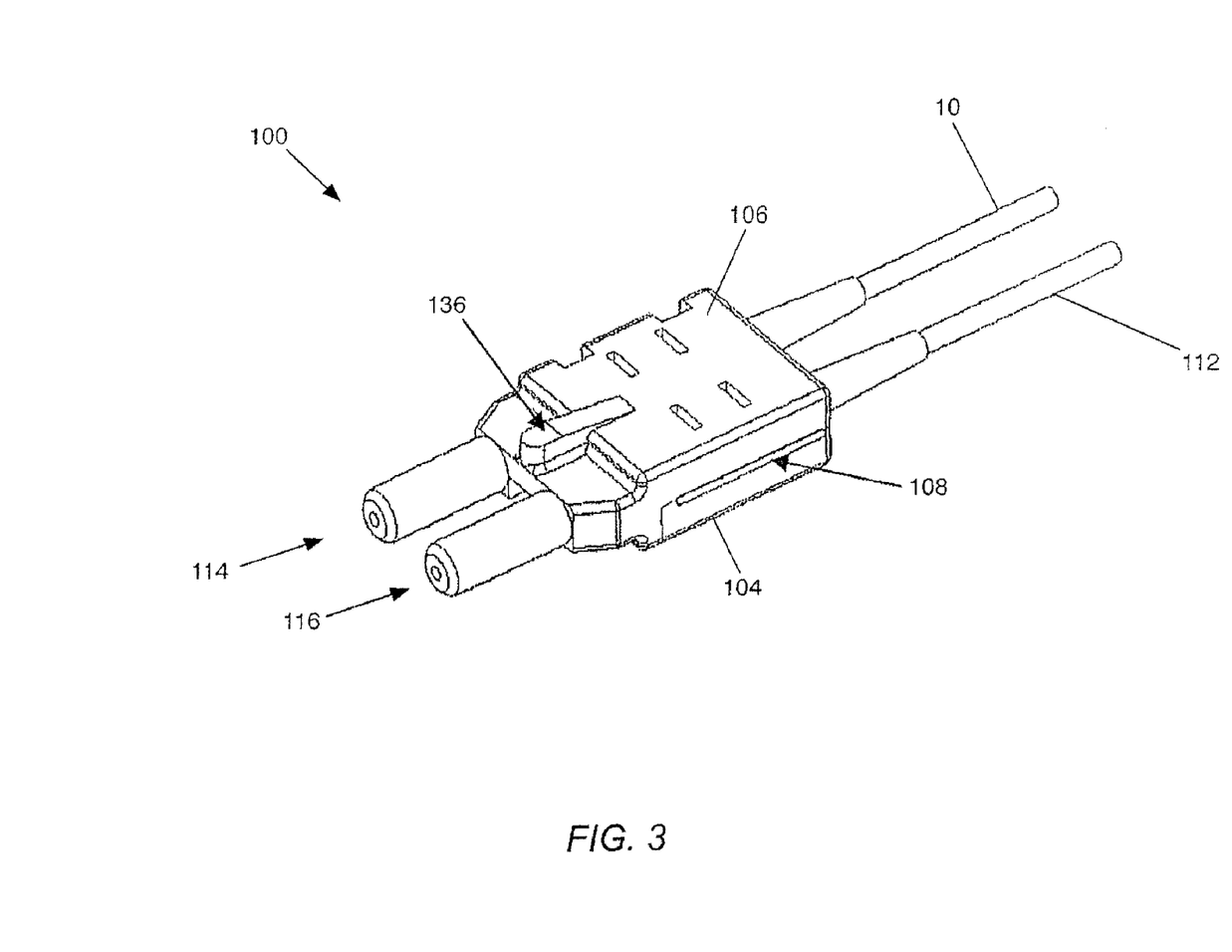
FIG. 3 illustrates a bottom view of the duplex fiber optic connector shown in FIGS. 1 and 2.

The duplex receptacle 208 has a slot 222 formed in the upper flexible retaining element 218 and a cut-away 224 formed in the lower flexible retaining element 220. The functions of the slot 222 and of the cut-away 224 are described below in detail with reference to FIGS. 2 and 10. The configuration of the duplex receptacle 208 provides several advantages. One of the advantages is that the flexible retaining elements 218 and 220 that define the C-shaped opening 210 enable the SFP optical transceiver module 200 to couple with a single-piece optical connector 100 (FIGS. 1-3). This enables the optical connector 100 and the SFP optical transceiver module 200 to have less mechanical complexity than existing optical connectors and SFP optical transceiver modules that are used together. This reduced mechanical complexity enables these parts to be manufactured more easily and at reduced costs compared to existing optical connectors and SFP optical transceiver modules. Another advantage is that the duplex receptacle 208 may be made smaller than existing POF receptacles, such as the SC-RJ receptacle and VL receptacle, for example, thus allowing a higher port density to be achieved in a communication system.

The housing 212A, 212B of the SFP optical transceiver module 200 houses an optical transmitter and an optical receiver, which are not shown in FIG. 7 for ease of illustration. As is known in the art, the optical transmitter generally comprises components for generating an optical signal (e.g., a light source, such as a light-emitting diode (LED) or laser diode), and one or more optics elements for directing the light into the end of a transmit optical fiber. The optical receiver generally comprises the components for receiving an optical signal (e.g., a photodetector or photosensor, such as a photodiode), and one or more optics elements for directing light output from the end of a receive optical fiber onto the photodetector or photosensor. The optics elements of the transmitter and receiver of the module 200 are part of an optics assembly 213 that couples to the duplex receptacle 208.

As indicated above, the SFP optical transceiver module 200 has an electrical assembly 214 (e.g., a PCB) that includes a plug end 230 for electrically interfacing the electrical circuitry of the module 200 with electrical circuitry of a communication management system (not shown), such as, for example, a network hub, a router, a switch, or any other data communication device or equipment. Thus, the SFP optical transceiver module 200 is "pluggable". The term "pluggable", as that term is used herein, means that the module 200 can be plugged into and unplugged from a mating receptacle (not shown) of a communications management system. The act of plugging the module 200 into the mating receptacle of the communications management system causes the electrical interconnections to be made between electrical circuitry of the module 200 and electrical circuitry of the communications management system. In other words, the electrical connection between the plug end 230 and the electrical contacts (not shown) of the communications management system (not shown) is parallel to the direction of insertion of the module 200 into the communications management system. The act of unplugging the module 200 from the communications management system causes the electrical interconnections between the electrical circuitry of the module 200 and electrical circuitry of the communications management system to be removed.

The housing 212A, 212B may comprise any suitable material. In one embodiment, the housing 212 may be integrally formed from a plastic or similar material using, for example, injection molding or other manufacturing techniques. In other embodiments, the housing 212 may comprise separate components made of other materials, which are joined together to form the optical transceiver module 200.

Figure 8:
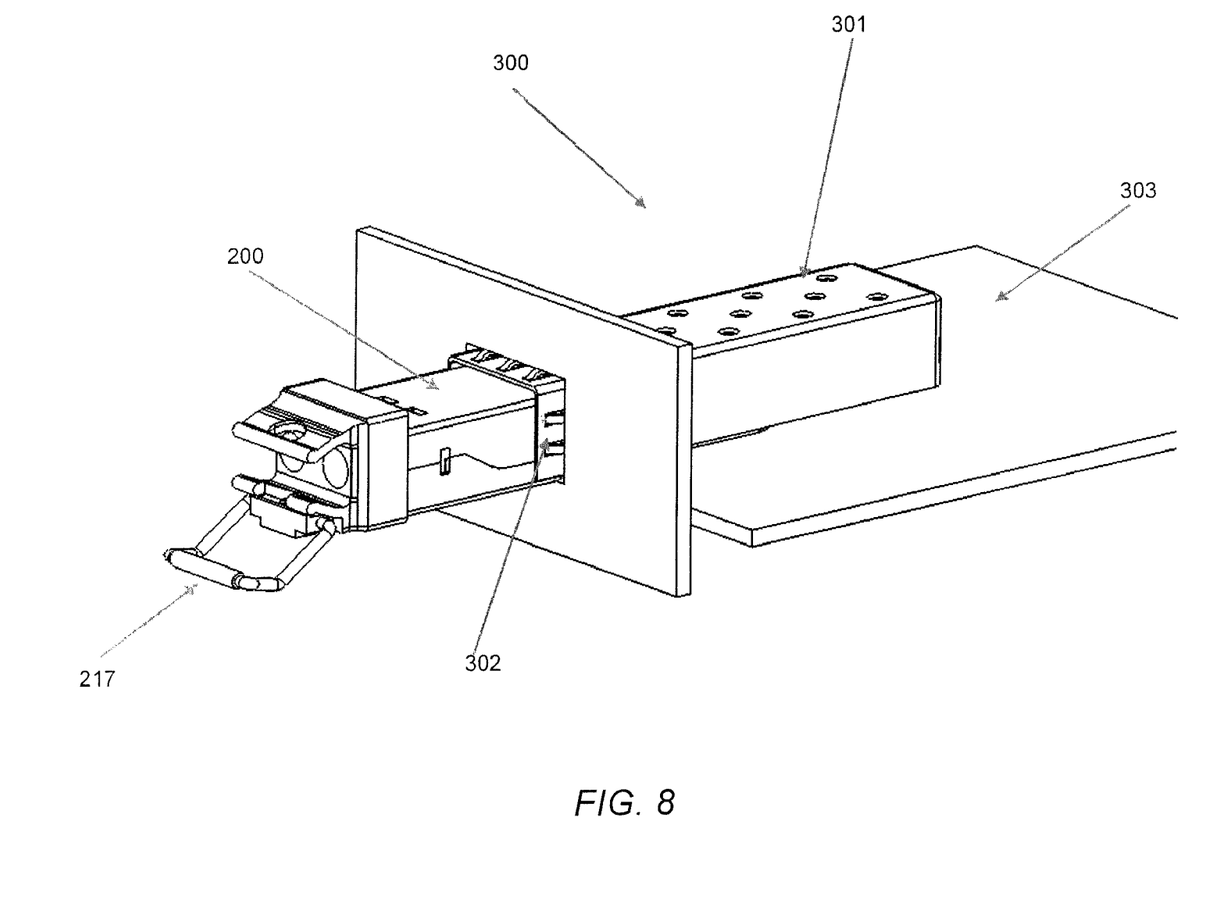
FIG. 8 illustrates a perspective view of the SFP optical transceiver module shown in FIG. 7 in its assembled state as the module is being inserted into a housing of a cage of a communications management system.

The latching mechanism 215 includes a latch element 216 and a bail 217, which operate to removably secure the optical transceiver module 200 to a cage housing, as will now be described with reference to FIG. 8. FIG. 8 illustrates a perspective view of the SFP optical transceiver module 200 shown in FIG. 7 as the module 200 is being inserted into a housing 302 of a cage 301 of a communications management system 300. The cage 301 is attached to a PCB 303, which is also part of the communications management system 300. The PCB 303 includes electrical interconnections (not shown) that come into contact with the electrical contacts 231 located on the plug end 230 of the electrical assembly 214 (FIG. 7), which is typically a PCB. As indicated above, the electrical coupling between the electrical contacts 231 located on the plug end 231 and the electrical interconnections of the PCB 303 of the communications management system 300 are made in a direction that is generally parallel to the direction of insertion of the module 200 into the cage housing 302.

Figure 9:
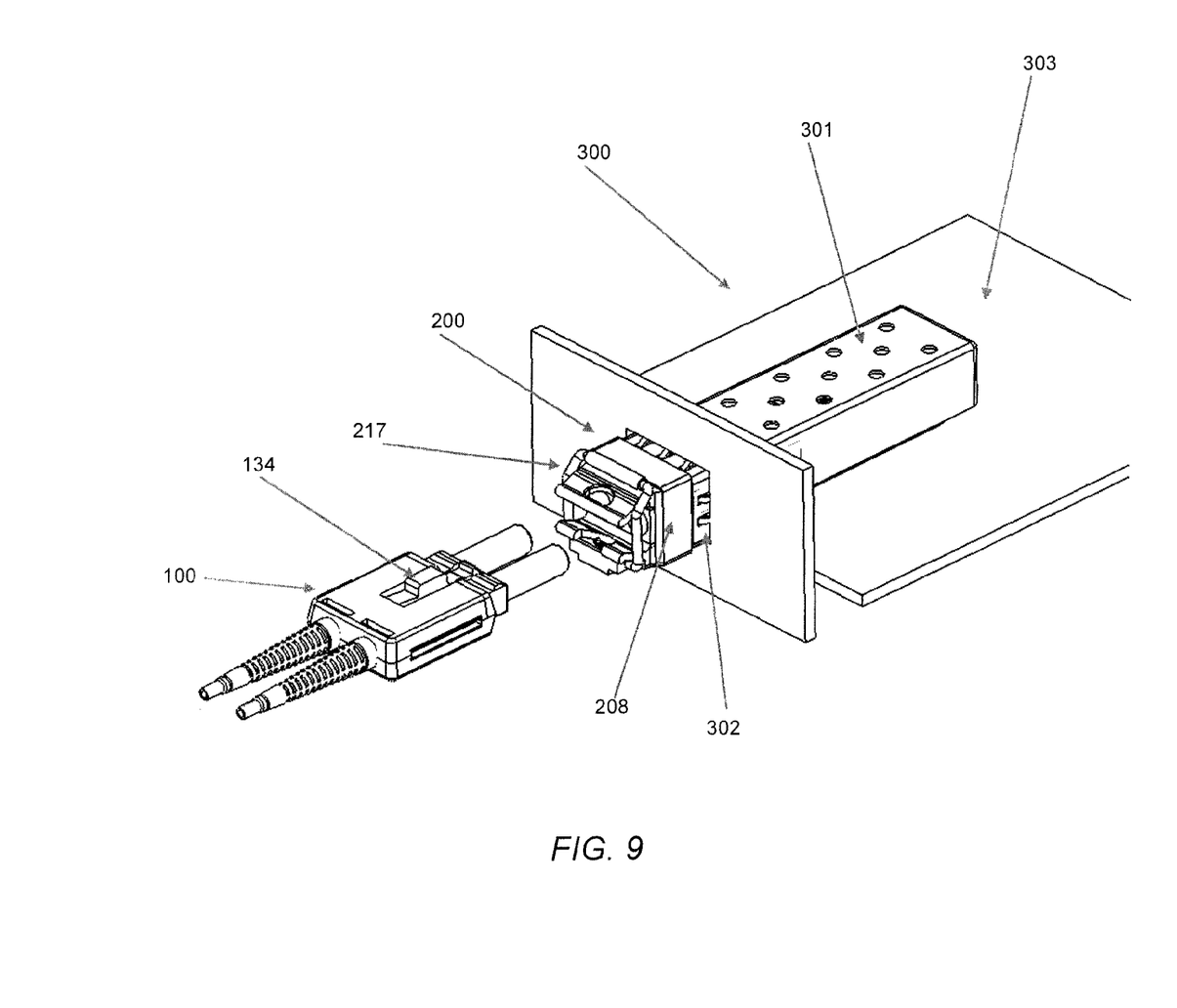
FIG. 9 illustrates a perspective view of the SFP optical transceiver module and communications management system shown in FIG. 8 after the transceiver module has been inserted into and locked to the housing of the cage and prior to insertion of the connector into the transceiver module.

FIG. 9 illustrates a perspective view of the SFP optical transceiver module 200 and communications management system 300 shown in FIG. 8 after the module 200 has been inserted into the housing 302 of the cage 301. When the module 200 is inserted fully into the cage housing 302, the latch element 216 of the latching mechanism 215 (FIG. 7) engages a latch locking mechanism (not shown) located on the cage housing 302 to lock the module 200 to the cage housing 302. In this manner, the optical transceiver module 200 is secured to the cage 301. The bail 217 is then moved to the upright position shown in FIG. 9. The module 200 can be removed from the cage 301 by moving the bail 217 to the horizontal position shown in FIG. 8 and pulling the module 200 in the horizontal direction of the bail 217 out of the cage 301. FIG. 9 also shows a perspective view of the connector 100 described above with reference to FIGS. 1-3 just prior to the connector 100 being inserted into the duplex receptacle 208 of the transceiver module 200.

Prior to describing additional features of the SFP optical transceiver module 200, the duplex connector 100 that connects to the module 200 will now be described with reference to FIGS. 1-3. FIG. 1 illustrates a perspective view of the duplex connector 100 with the connector housing 102 open to expose the interior of the connector 100. The duplex optical connector 100 is suitable for terminating glass fibers, which typically have a core diameter of about 125 micrometers (μm) as well as POFs, which typically have a core diameter of about 980 μm. In accordance with this embodiment, a pair of channels 120 is formed on both the top portion 104 and the bottom portion 106 of the connector housing 102 for receiving fiber cores 118. The pairs of channels 120 are aligned such that the transmitter optical fiber cable 110 and the receiver optical fiber cable 112 are securely positioned within the channels 120 and the fiber cores 118 are precisely aligned with the ferrules 114 and 116. Cable alignment/restraining elements 122 may be positioned along the channels 120 to guide and hold the optical fiber cables 110 and 112 during installation, or to further support or align the fiber cores 118 of the fiber optic cables 110 and 112.

As further illustrated in FIG. 1, the optical fiber cables 110 and 112 enter the connector housing 102 at the end opposite ferrules 114 and 116. Cables 110 and 112 comprise a predefined length of fiber core 118. The length of core exposed may be based on the physical dimensions of the interior of the duplex fiber optic connector 100. For example, the length of fiber core 118 may be based on the length of core to be received in ferrules 114 and 116. During installation, the fiber core 118 may be exposed by stripping off the fiber cable jacket with, for example, a fiber stripping tool. In one embodiment, the optical fiber cables 110 and 112 may comprise a plastic or acrylic optical fiber with, for example, a general-purpose resin as the core material and a polymer material for the cladding material. It should be appreciated, however, that alternative materials may be used for the core, cladding, or other components.

The optical fiber cables 110 and 112 may include a strain relief boot 124. The strain relief boots 124 may cover the optical fiber cables at or near the point at which the cable enters the connector housing 102. The strain relief boots 124 may be formed on the fiber optic cable or, alternatively, may be inserted over the cables 110 and 112 during installation. To assist in the installation process and support the retention of the cables 110 and 112 within the connector housing 102, the strain relief boots 124 may incorporate a ring 126 which engages with a corresponding recess in the top portion 104 and/or the bottom portion 106 of the connector housing 102. During installation, the strain relief boots 124 may be placed onto the bottom portion 106 of the connector housing 102 with the ring 126 resting in the recess and the fiber cores 118 inserted into the corresponding ferrules. The fiber core 118 extends along the length of the corresponding ferrule and ends at or near a ferrule front face 119. The cable alignment/restraining elements 122 restrain the cables 110, 112 and hold them in place when the top portion 104 and the bottom portion 106 of the connector housing 102 are closed onto each other.

With the fiber optic cables 110 and 112 in place within the connector housing 102, the top portion 104 and the bottom portion 106 may be clamped together via a latching mechanism. As illustrated in FIG. 1, one or more flexible latching elements 128 may be placed on the underside of the top portion 104. One or more corresponding latch holding features 130 may be placed on the bottom portion 106. The flexible latching elements 128 and the latch holding features 130 may be formed integrally with the connector housing 102 or otherwise attached to the connector housing 102. The flexible latching elements 128 are positioned to latch onto the latch holding features 130 when the top portion 104 is closed onto the bottom portion 106. The flexible latching elements 128 may be depressed to release the latching mechanism and enable the connector housing 102 to be opened.

Having described the general components of the duplex fiber optic connector 100 and the optical transceiver module 200, the orientation and latching features mentioned above will now be described in more detail. FIG. 2 illustrates a side perspective view of the connector 100 with the ferrules 114, 116 of the cables 110, 112 secured therein. In accordance with the embodiment illustrated in FIG. 2, a latch element 132 is positioned on the top portion 104 of the connector housing 102. The latch element 132 is designed to be lower than top portion 104 of connector housing 102 and strategically placed in between ferrules 114, 116, which provides three-way protections against damage from external elements. The latch element 132 has a flexible base element. The flexible base element may be configured to vertically flex relative to the connector housing 102 such that the latch element 132 is depressed as the connector 100 is inserted into the duplex receptacle 208 of the the transceiver module 200. When the connector 100 is fully inserted in the duplex receptacle, the angled front surface on the latch element 132 engages the slot 222 (FIG. 7) formed in the upper flexible retaining element 218 of the duplex receptacle. 208, thereby locking the connector 100 to the transceiver module 200.

FIG. 3 illustrates a bottom perspective view of the connector 100 with the ferrules 114, 116 and the cables 110, 112 secured therein. The bottom surface of the housing of the connector 100 has an orientation key 136 thereon, which engages the cut-away 224 (FIG. 7) of the lower flexible retaining element 220 when the connector 100 is inserted into the duplex receptacle 208, as will be described below in more detail.

With reference again to FIG. 7, in accordance with an embodiment, the upper flexible retaining element 218 and the lower flexible retaining element 220 extend outward from the duplex receptacle 208 to form the C-shaped opening 210. The flexible retaining elements 218 and 220 may be slightly angled toward the ferrule alignment holes 204 and 206 (FIG. 7). In this manner, the flexible retaining elements 218 and 220 may clamp down on the duplex fiber optic connector 100 when the ferrules 114 and 116 are inserted into the alignment holes 204 and 206. The slot 222 and cut-away 224 allow the left and right sides of the flexible retaining elements 218 and 220 to deflect independently. This feature of the retaining elements 218 and 220 enables the retaining elements 218 and 220 to clamp down on the connector 100 effectively even when the diameters of the ferrules 114, 116 vary.

Figure 4:
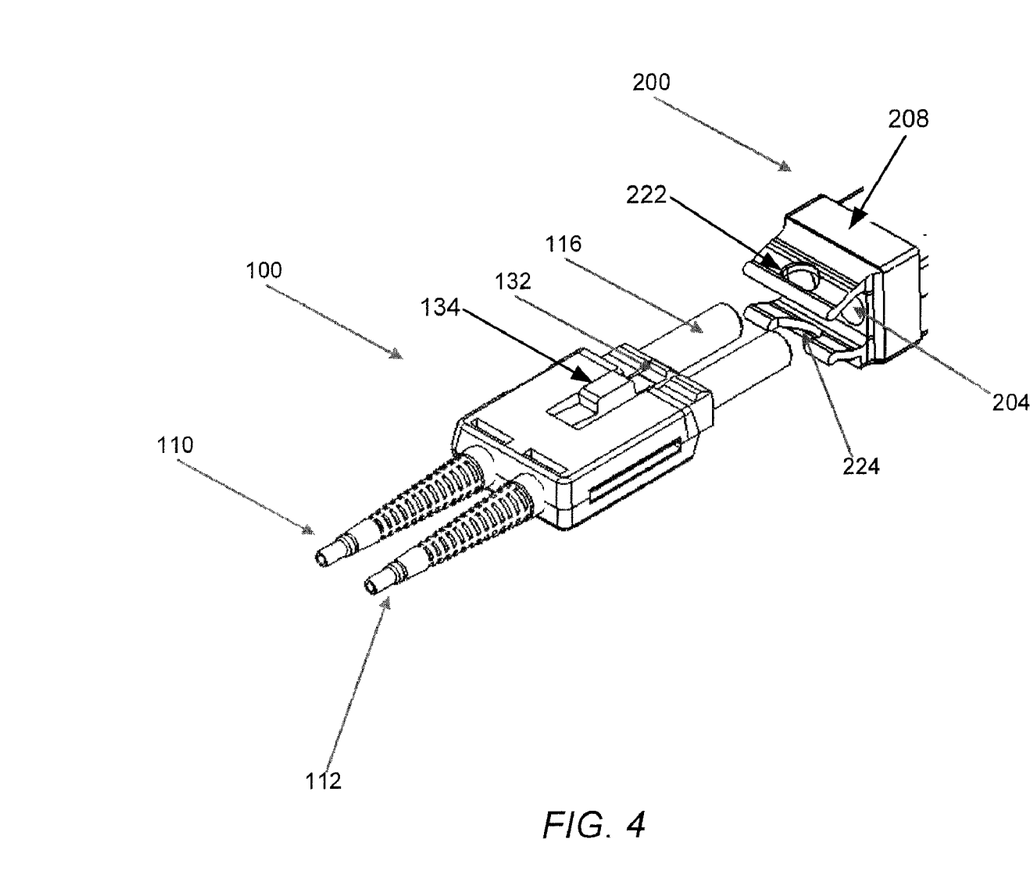
FIG. 4 illustrates the duplex fiber optic connector shown in FIGS. 1-3 being installed into the SFP optical transceiver module in accordance with an embodiment of the invention.
Figure 5:
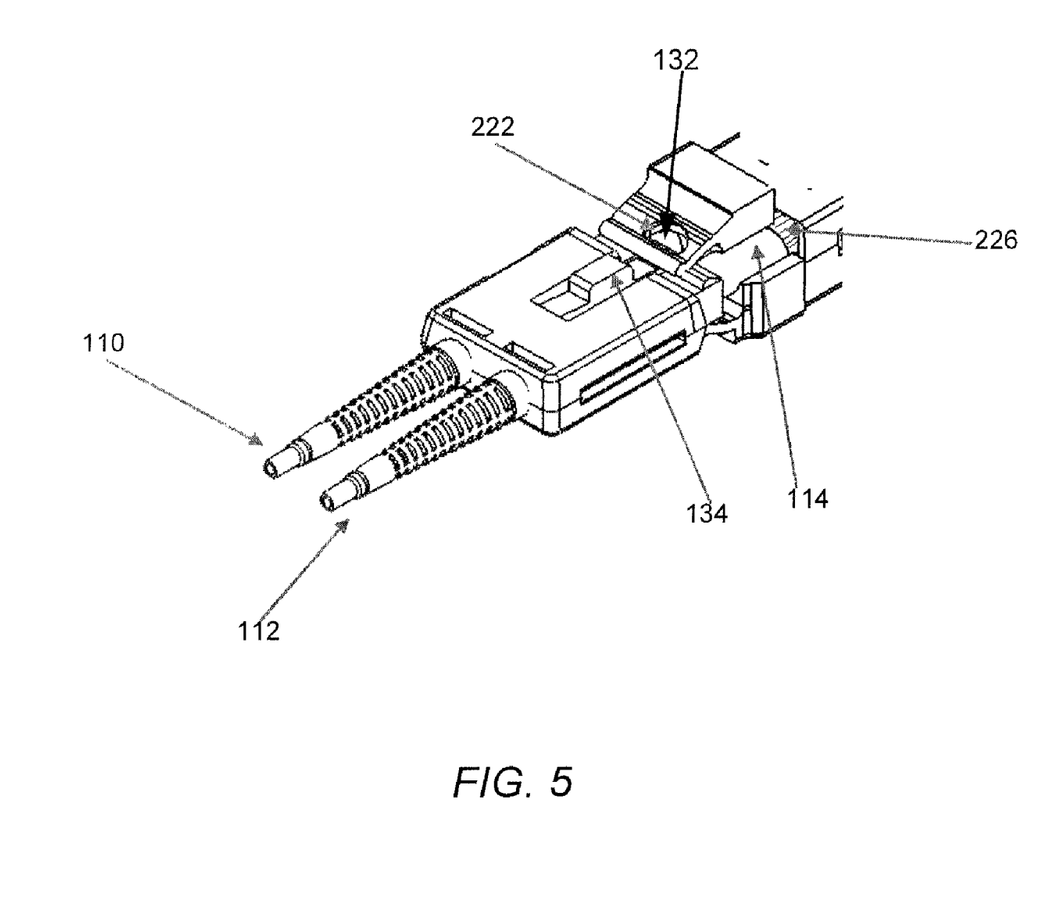
FIG. 5 illustrates a top perspective view of the engagement of the duplex fiber optic connector shown in FIGS. 1-3 and the SFP optical transceiver module in accordance with an embodiment of the invention.

FIG. 4 illustrates a perspective view of the duplex fiber optic connector 100 and the SFP optical transceiver module 200, wherein the connector 100 is about to be engaged with the transceiver module 200. FIG. 5 illustrates a perspective view of the duplex fiber optic connector 100 in engagement with the SFP optical transceiver module 200. FIG. 5 shows the proper engagement of the latch element 132 with the slot 222 to retain the connector 100 in the transceiver module 200. It should be appreciated that the latch element 132 and the slot 222 may be shaped in various ways to implement the latching function. In one embodiment, the slot 222 is a triangular-shaped opening, although key and keyway arrangements may be employed. It should be further appreciated that the location of the latch element 132 and of the slot 222 may be varied. Furthermore, in alternative embodiments, the latch element 132 may further comprise a release tab 134 disposed on the flexible base element of the latch element 132 that extends above the upper surface of the connector housing 102 to enable the latch element 132 to be released from the slot 222 via exertion of a downward force on the release tab 134.

As indicated above with reference to FIG. 7, the lower flexible retaining element 220 of the duplex receptacle 208 of the transceiver module 200 includes a cut-away 224 for engaging the orientation key 136 (FIG. 3) on the connector 100. In this manner, the transceiver module 200 will only receive the connector 100 when the orientation key 136 (FIG. 3) is properly oriented with the cut-away 224. This orientation feature prevents the connector 100 from being improperly inserted with the ferrules 114 and 116 reversed relative to the alignment holes 204 and 206. It should be appreciated that the orientation key 136 and the cut-away 224 may be shaped in various ways to accommodate a key-to-keyway engagement. It should be further appreciated that the number and location of these elements may be varied. Furthermore, in alternative embodiments, the orientation key 136 may be positioned on the transceiver module 200 and the cut-away 224 may be placed on the connector 100.

With reference again to FIGS. 5 and 7, the manner in which the duplex optical fiber connector 100 may be inserted into the SFP optical transceiver module 200 is demonstrated. The ferrules 116 and 114 may slide along the alignment holes 204 and 206, respectively, of the transceiver module 200 and stop when the front faces 119 of the ferrules 114, 116 come in contact with the optical reference element 226 (FIG. 5) of the transceiver module 200. As the ferrules 114 and 116 are received in the alignment holes 204 and 206, the latch 132 engages the slot 222 and the orientation key 136 engages the cut-away 224.

Figure 6:
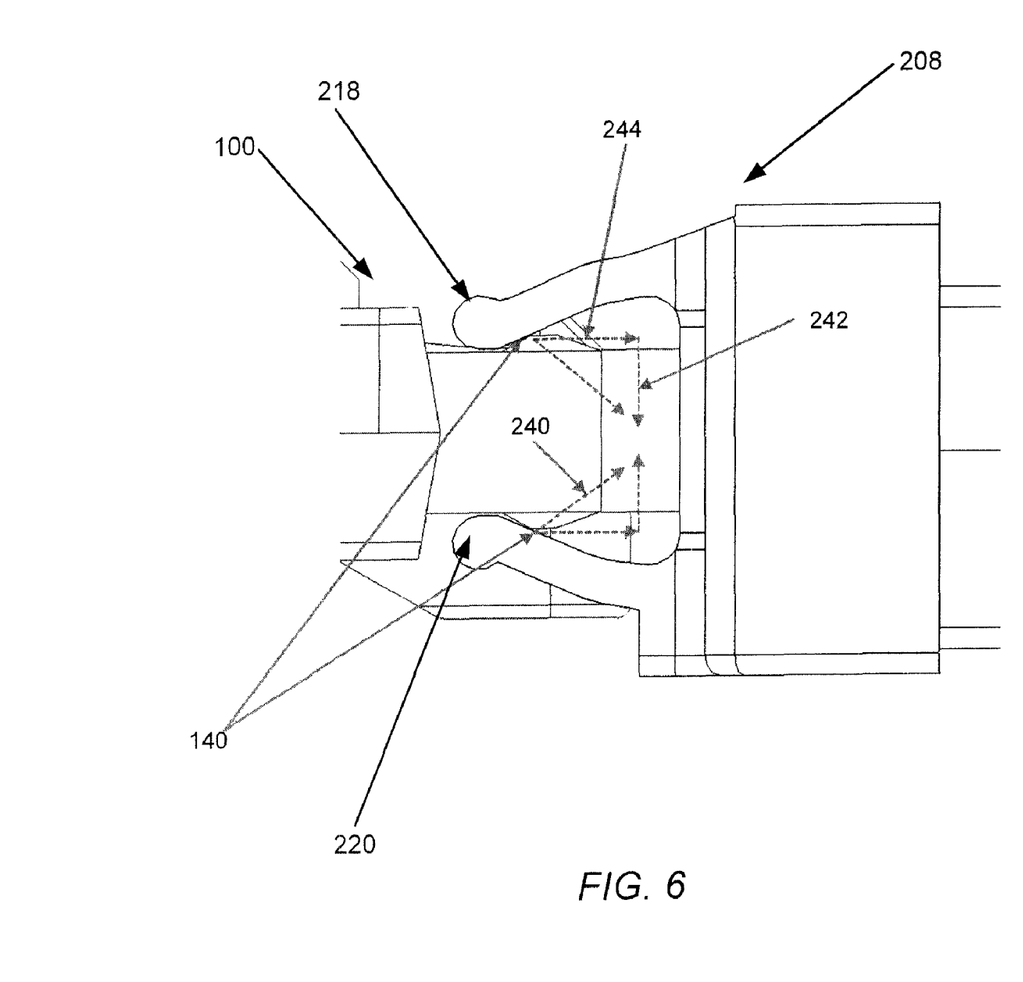
FIG. 6 illustrates a side view of the engaged duplex fiber optical connector and the SFP optical transceiver module shown in FIG. 5.

FIG. 6 illustrates a cross-sectional side view of the connector 100 after the connector 100 has been fully inserted into the receptacle 208 of the optical transceiver module 200. Areas on the connector 100 just behind the back ends of the ferrules (not shown) have slight protrusions on them that form slight indentations on the connector 100 that act as connector retention features. The connector retention features are identified by reference numeral 140 in FIG. 6. The flexible retaining elements 218, 220 of the duplex receptacle 208 are held by the connector retaining features 140, which, in turn, hold the ferrules 114, 116 in place in the connector 100 once the connector 100 is fully inserted into the receptacle 208. The interaction between the connector retention features 140 and the flexible retaining elements 218, 220 produces a resultant force 240 that is translated into a vertical force component 242 and a horizontal force component 244. The vertical force component 242 prevents movement of the ferrules in the vertical directions. The horizontal force component 244 pushes the connector 100 in the horizontal direction, which, in turn, preloads the ferrules causing the front faces of the ferrules to abut a transceiver optical reference 226 on the transceiver module 200, as demonstrated in FIG. 5.

Figure 10:
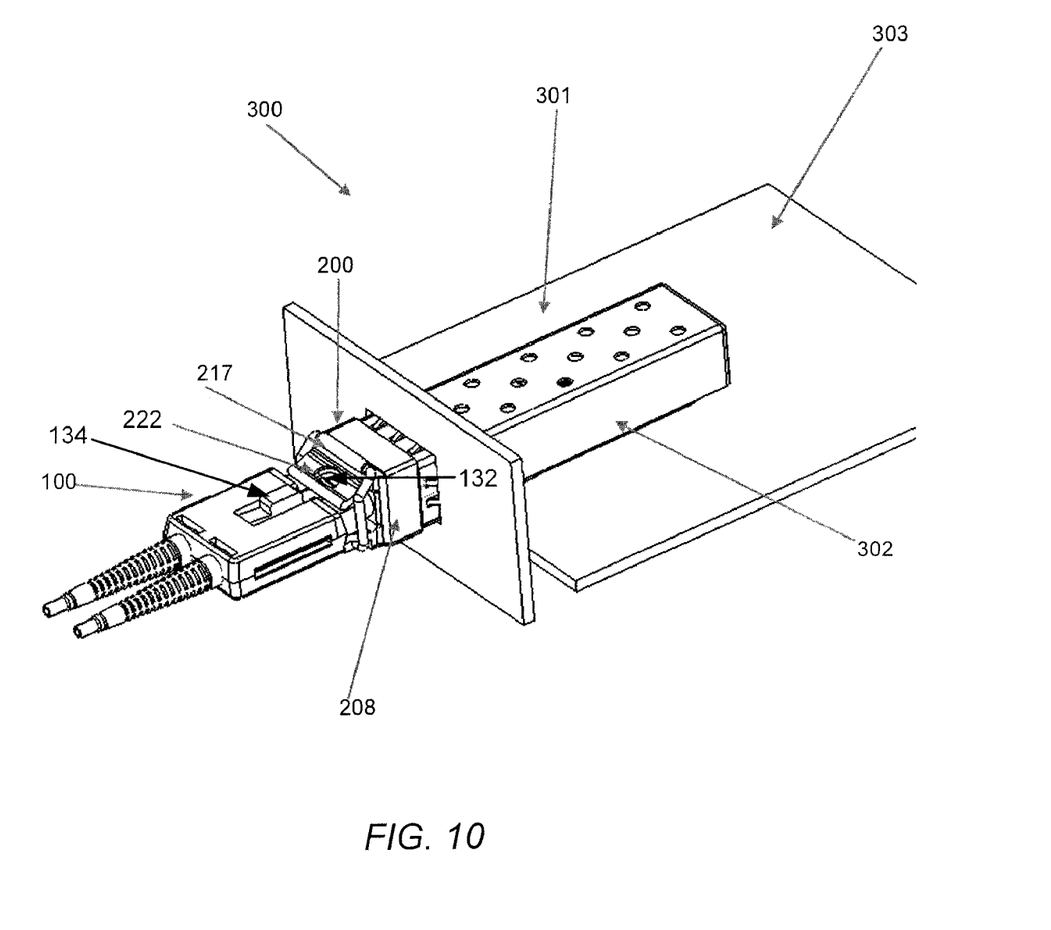
FIG. 10 illustrates a perspective view of the SFP optical transceiver module locked to the cage housing as shown in FIG. 9 and in engagement with the duplex connector shown in FIGS. 1-3.

FIG. 10 illustrates a perspective view of the SFP optical transceiver module 200 in engagement with the connector 100 and with the housing 302 of the cage 301 shown in FIGS. 8 and 9. The bail 217 of the module 200 is in the upright position. The connector 100 may be disengaged from the receptacle 208 of the module 200 by depressing the release tab 134 of the connector 100 to cause the latch element 132 to disengage from the slot 222 formed in the flexible upper retaining element 218 of the duplex receptacle 208, and by pulling the connector 100 away from the receptacle 208. After the connector 100 has been disengaged from the module 200, the module 200 may be disengaged from the cage 301 in the manner described above by moving the bail 217 to the horizontal position shown in FIG. 8 and pulling on the bail 217 to slide the module 200 out of the cage housing 302.

With reference again to FIG. 7, the electrical assembly 214 includes at least one active optical receiver element, such as a photodiode, for example, and at least one active optical transmitter element, such as a laser diode or LED, for example. Additionally, the electrical assembly 214 typically also includes one or more transmitter and receiver integrated circuits (ICs). For example, the electrical assembly 214 typically also includes a driver IC for driving the LED or laser diode, a receiver IC for processing the electrical signals produced by the receiver photodiode, and a controller IC for controlling the transmitter and receiver operations. For ease of illustration, the components of the electrical assembly 214 are not shown in FIG. 7.

The SFP optical transceiver module 200 having the receptacle 208 with the C-shaped opening formed in it is suitable for receiving POF cables or glass fiber cables. Thus, the SFP optical transceiver module 200 has all of the advantages associated with known SFP optical transceiver modules plus the additional advantages associated with the use of POFs, including lower costs than glass fibers, less susceptibility to dust particles than glass fibers due to the larger core diameters of POFs, and easier repair and termination than glass fibers. Furthermore, as described above, the transceiver module 200 and the connector 100 can be made with less mechanical complexity, which simplifies the manufacturing process and reduces costs. In addition, the latching element 132 on the connector 100 and the slot 222 in the upper flexible retaining element 218 provide strength and robustness when the connector 100 is engaged with the transceiver module 200.

It should be noted that this disclosure has been presented with reference to one or more exemplary or illustrative embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method for providing optical communications, the method comprising:
   providing a duplex optical connector having a housing configured to be secured to a duplex SFP optical transceiver module;
   securing a first end of a first optical fiber cable to the duplex optical connector, the first end of the first optical fiber cable having a first ferrule thereon that surrounds a first end of a first optical fiber of the first optical fiber cable;
   securing a first end of a second optical fiber cable to the duplex optical connector, the first end of the second optical fiber cable having a second ferrule thereon that surrounds a first end of a second optical fiber of the second optical fiber cable;
   providing a small form factor pluggable (SFP) optical transceiver module having a C-shaped opening therein, the C-shaped opening being defined on upper and lower portions of the C-shaped opening by upper and lower flexible retaining elements, respectively, configured to receive and retain the duplex optical connector; and
   connecting the duplex optical connector to the SFP optical transceiver module.

2. The method of claim 1, wherein the SFP optical transceiver module further comprises:
   an electrical assembly secured within the transceiver module housing, the electrical assembly comprising a printed circuit board (PCB) having at least a front end and a back end, the back end being configured as a plug end for removably plugging the PCB into a receptacle of an external communications management system, the plug end having electrical contacts thereon for electrically connecting electrical circuitry of the PCB to electrical interconnections in the receptacle of the external communications management system, the PCB having at least one active optical receiver device and at least one active optical transmitter device electrically connected thereto, the active optical receiver device being configured to produce an electrical data signal in response to an optical data signal being received thereby, the active optical transmitter device being configured to produce an optical data signal in response to an electrical data signal being received thereby.

3. The method of claim 2, wherein the SFP optical transceiver module housing is adapted to be inserted into a housing of a cage comprising said external communications management system, the cage having an opening formed therein that corresponds to the receptacle of the external communications management system, and wherein the electrical connection between the electrical contacts on the plug end and the electrical interconnections in the receptacle of the external communications management system is generally parallel to the direction of insertion of the SFP optical transceiver module into the opening formed in the cage housing.

4. The method of claim 3, wherein the SFP optical transceiver module further comprises an optical assembly secured to the transceiver module housing, the optical assembly comprising at least one receiver optical element and at least one transmitter optical element, and wherein the method further comprises:
   with the receiver optical element, directing an optical data signal output from the first end of the first optical fiber onto the active optical receiver device; and
   with the transmitter optical element, directing an optical data signal produced by the active optical transmitter device onto the first end of the second optical fiber.

5. The method of claim 1, wherein the first and second optical fibers are polymer optical fibers (POFs).

6. The method of claim 1, wherein one of the upper and lower flexible retaining elements is configured with a locking/unlocking feature that enables the duplex optical connector to be removably secured to the duplex receptacle of the duplex SFP optical transceiver module.

7. The method of claim 6, wherein the upper flexible retaining element of the duplex receptacle is configured with the locking/unlocking feature.

8. The method of claim 1, wherein one of the upper and lower flexible retaining elements has a keyway formed therein that is adapted to receive an orientation key disposed on the duplex optical connector.

9. The method of claim 8, wherein one of the lower flexible retaining element has the keyway formed therein.

10. A method for providing optical communications, the method comprising:
    providing a small form factor pluggable (SFP) optical transceiver module; and
    connecting a duplex optical connector to the SFP optical transceiver module, wherein the SFP optical transceiver module comprises:
       a transceiver module housing having a front end and a back end;
       a duplex receptacle secured to the front end of the transceiver module housing, the duplex receptacle having a C-shaped opening therein, the C-shaped opening being defined on upper and lower portions of the C-shaped opening by upper and lower flexible retaining elements, respectively, configured to receive and retain the duplex optical connector, the duplex optical connector having first ends of the first and second optical fiber cables secured thereto, the duplex receptacle having first and second optical ports configured to receive first and second ferrules secured to the first ends of the first and second optical fiber cables, respectively; and an electrical assembly secured within the transceiver module housing, the electrical assembly comprising a printed circuit board (PCB) having at least a front end and a back end, the back end being configured as a plug end for removably plugging the PCB into a receptacle of an external communications management system, the plug end having electrical contacts thereon for electrically connecting electrical circuitry of the PCB to electrical interconnections in the receptacle of the external communications management system.

11. The method of claim 10, wherein the SFP optical transceiver module further comprises an optical assembly secured to the transceiver module housing, the optical assembly comprising at least one receiver optical element and at least one transmitter optical element, the method further comprising:

with the receiver optical element, directing an optical data signal output from the first end of the first optical fiber onto an active optical receiver device of the electrical assembly; and with the transmitter optical element, directing an optical data signal produced by the active optical transmitter device of the electrical assembly onto the first end of the second optical fiber.

12. The method of claim 10, wherein the first and second optical fibers are polymer optical fibers (POFs).

13. The method of claim 10, wherein one of the upper and lower flexible retaining elements is configured with a locking/unlocking feature that enables the duplex optical connector to be removably secured to the duplex receptacle of the duplex SFP optical transceiver module.

14. The method of claim 13, wherein the upper flexible retaining element of the duplex receptacle is configured with the locking/unlocking feature.

15. The method of claim 10, wherein one of the upper and lower flexible retaining elements has a keyway formed therein that is adapted to receive an orientation key disposed on the duplex optical connector.

16. The method of claim 15, wherein one of the lower flexible retaining element has the keyway formed therein.

* * * * *